(12) United States Patent
Chen

(10) Patent No.: US 12,491,477 B2
(45) Date of Patent: Dec. 9, 2025

(54) MEMBRANE FILTER UNIT

(71) Applicant: ZHEJIANG QINYUAN WATER TREATMENT S.T. CO., LTD., Zhejiang (CN)

(72) Inventor: Xuefang Chen, Hangzhou Bay New Area Ningbo (CN)

( * ) Notice: Subject to any disclaimer, the term of this patent is extended or adjusted under 35 U.S.C. 154(b) by 412 days.

(21) Appl. No.: 18/037,343

(22) PCT Filed: Nov. 2, 2021

(86) PCT No.: PCT/EP2021/080289
§ 371 (c)(1),
(2) Date: May 17, 2023

(87) PCT Pub. No.: WO2022/106185
PCT Pub. Date: May 27, 2022

(65) Prior Publication Data
US 2024/0009627 A1    Jan. 11, 2024

(30) Foreign Application Priority Data

Nov. 18, 2020 (WO) ................ PCT/CN2020/129743
Jan. 13, 2021 (EP) .................................... 21151252

(51) Int. Cl.
*B01D 63/10*     (2006.01)
*B01D 61/02*     (2006.01)
(Continued)

(52) U.S. Cl.
CPC ......... *B01D 63/107* (2022.08); *B01D 61/025* (2013.01); *B01D 65/08* (2013.01);
(Continued)

(58) Field of Classification Search
CPC .... B01D 63/107; B01D 61/025; B01D 65/08; B01D 2313/08; B01D 2313/21;
(Continued)

(56) References Cited

U.S. PATENT DOCUMENTS 3,695,446 A * 10/1972 Lyall ..................... B01D 61/08
                                                                 210/438
4,645,601 A *  2/1987 Regunathan ........... B01D 65/00
                                                                 210/438
(Continued)

FOREIGN PATENT DOCUMENTS

JP       2015089536 A    5/2015
WO    2019146342 A1    8/2019

OTHER PUBLICATIONS

International Search Report and Written Opinion issued in corresponding International Application No. PCT/EP2021/080289 dated Jan. 28, 2022, pp. 1-11.
(Continued)

*Primary Examiner* — Waqaas Ali
(74) *Attorney, Agent, or Firm* — Clement Cheng

(57) ABSTRACT

Disclosed is a membrane filter unit which includes: a filter case for housing a membrane; an inner tube housing a wastewater chamber and a hollow core tube, a middle tube housing a pure water chamber; the hollow core tube having a top opening at a top end and a bottom opening at a bottom end, and having a water collecting channel on its outer wall and positioned coaxially inside the case, wherein the top opening is adapted to open into the wastewater chamber; and a membrane having an inner peripheral surface, a top outer peripheral surface, a bottom outer peripheral surface and a side outer peripheral surface; and arranged around the core tube such that the inner peripheral surface of the membrane is spirally wound around the core tube and the side outer peripheral surface is capable of permeation of raw water through its surface.

14 Claims, 7 Drawing Sheets

(51) Int. Cl.
*B01D 65/08* (2006.01)
*C02F 1/44* (2023.01)

(52) U.S. Cl.
CPC .......... *C02F 1/441* (2013.01); *B01D 2313/08* (2013.01); *B01D 2313/21* (2013.01)

(58) Field of Classification Search
CPC ............ B01D 2313/10; B01D 2313/12; B01D 2313/44; B01D 2315/10; C02F 1/441
See application file for complete search history.

(56) References Cited

U.S. PATENT DOCUMENTS 5,389,260 A * 2/1995 Hemp .................... B01D 65/00
 210/450
6,099,735 A * 8/2000 Kelada .................... C02F 1/441
 210/257.2

OTHER PUBLICATIONS

International Preliminary Report on Patentability issued in corresponding International Application No. PCT/EP2021/080289 dated Oct. 17, 2022, pp. 1-8.

* cited by examiner

MEMBRANE FILTER UNIT

CROSS-REFERENCE TO RELATED APPLICATIONS

The application corresponds to PCT/EP2021/080289, filed Nov. 2, 2021, entitled "A MEMBRANE FILTER UNIT", which claims priority to PCT/CN2020/129743, filed Nov. 18, 2020 and EP21151252.0, filed Jan. 13, 2021, the entirety of both are incorporated herein by reference.

FIELD OF THE INVENTION

The invention relates to a membrane filter unit and more particularly to a roll-type filter membrane with higher efficiency and prolonged lifetime due to its structure and design.

BACKGROUND OF THE INVENTION

Pressure driven spiral wound membrane filters are widely used in household water purifiers to provide purified water for consumers. The use of spiral wound membranes is advantageous in that it affords very high quality of water to consumers.

Traditionally, the spiral wound membrane elements are formed by winding a plurality of purification membrane groups around a central perforated treated water tube. The purification membrane group is formed by laminating a mesh-like treated water guiding member, a dual-folded membrane and a mesh-like feed water guiding member inside of the dual-folded membrane. A feed water flow channel is formed along the inner surfaces of the dual-folded membrane and a treated water flow channel is formed between the outside surfaces of the adjacent dual-folded membrane.

When such membrane element is in operation, the feed water enters the feed water flow channel from one end, either side surfaces or outside surface, of the spiral wound membrane element. Treated water is obtained by passing the feed water through the membrane. The treated water flows along the treated water guiding member and into the central treated water tube through the water collection hole. The remaining water which is not filtered flows along the feed water guiding member and is discharged from another end of the spiral wound membrane element as concentrated water. In such traditional spiral wound membrane elements, the main problems are scaling, fouling, falling rejection, reduction in performance (reduced flow or higher pressure), over the time, impurities accumulate and are likely to easily contaminate the membrane, resulting in shortening the lifetime of the membrane element.

A lot of efforts have been made to improve the lifetime of the spiral wound membrane element.

U.S. Pat. No. 4,645,601 A (Everpure. 1987) discloses a reverse osmosis system including a head member adapted to be fixedly mounted in a fluid supply line with an integral disposable RO unit inserted therein. The osmosis unit includes a pressure vessel, an end member attached to it and an RO membrane module disposed in the pressure vessel and operatively associated with the end member.

U.S. Pat. No. 3,695,446 A (Culligan 1972) discloses an RO membrane module assembly that provides a high degree of adaptability to various locations and positions as well as economical manufacture and efficient maintenance. It comprises a closed receptacle having a detachable first-end closure for all plumbing connections. Membrane module means are removably supported in the receptacle chamber on an inlet tube connected to the first end closure. The membrane module has one or more modules each comprising a body member having a hollow tubular member extending beyond both ends of the body member. The end portions of the tubular member have connection means thereon that allows quick and simple attachment of the modules to the closure means and to each other in series. A product water passageway that provides for the removal of product water from the membrane module means is formed between the inside diameter of the membrane module tubular member and the outer diameter of the inlet tube. In operation feed water flows in through the first end closure means, through the inlet tube past the membrane in a first direction, enters the chamber at a point remote from the closure means, reverses direction to flow back through the chamber and through the membrane module means where product water passes through the membrane under a pressure differential and wastewater flows past the membrane. Both the product water and the wastewater then pass out of the chamber through the first end closure means.

U.S. Pat. No. 6,099,735 A (Maher Kelada, 2000) discloses counter top RO device for home use. It is connected to a water supply and contains a closed fluid treatment circuit extending to a water outlet. The closed fluid circuit flows through a plurality of replaceable water treatment modules mounted on a flow board and each having a specific water treatment function, such as the removal of a particular material by use of RO, filtration, carbon adsorption, ion exchange or the addition of a chemical to balance the desired water conditions. Preferably the circuit also includes a UV light, for the purpose of sanitizing the water.

U.S. Pat. No. 5,389,260 A (Clack Corp, 1995) discloses a filter including a filter element, a brine seal located at the top of the filter element and engaging a boss depending from the system manifold. The brine seal isolates a rinse water discharge port, communicating with an outlet of the filter element, from an untreated water inlet port formed in the boss to ensure that the water to be treated passes through the filter membrane as opposed to directly out of the rinse water discharge port. This configuration eliminates the need for an exterior feed line, thus simplifying the system and preventing vibration during system start-up. The brine seal also structurally reenforces the filter element, facilitates assembly of the filter, increases the capacity of the assembly, and reduces the chances of failure and leakage.

JP2015089536 A (Toray, 2015) discloses a separation membrane element where backflow, back pressure and contamination from a permeation side can be prevented even when a check valve disposed at downstream from a separation membrane module is damaged and removal can be achieved to be easier than ever before without requiring manpower and time when inspecting. In a separation membrane element, a membrane unit including a separation membrane to separate the component of a medium to be treated is wound to be spiral around a center tube having a plurality of pores, the outer periphery of the wound membrane unit has a structure that a wound body is formed by being covered with an outer package, and the center tube disposed with a check valve at downstream side from a pore at a lowermost downstream part in a plurality of the pores existing on the side surface of the center tube is used.

JPW02019146342 A1 (Toray, 2020) discloses a membrane separation system including separation membrane elements connected to one another, each of the separation membrane elements including a plurality of separation membrane pairs, each separation membrane pair including separation membranes each having a feed-side surface and a permeate-side surface and disposed such that the feed-side surfaces face each other, in which the plurality of separation membrane elements include a first separation membrane element and a second separation membrane element, and at least one first separation membrane element serves as a stage preceding the second separation membrane element.

Many of the membrane filter units either use chemicals to solve such problems such as descalants or modify the design of the filtration unit, however most of them have complicated or bulky design or incur high costs for alleviating these problems. Therefore, the present inventors have recognized that there is a need to develop a spiral wound reverse osmosis membrane element with a prolonged lifetime and which is easy to be made, is simple, not complicated and does not incur additional costs as compared to traditional spiral wound membranes.

SUMMARY OF THE INVENTION

In accordance with a first aspect of the present invention provided is a membrane filter unit comprising:
(a) filter case for housing a membrane;
(b) an inner tube housing a waste water chamber and a hollow core tube, a middle tube housing a pure water chamber and an outer tube housing a feed water chamber, wherein the inner tube, the middle tube and the outer tube are coaxially arranged, and formed inside the filter case (2) between the inner wall of the filter case (2) and other components positioned within the filter case and inner tube (4) is formed by at least a part of the central hollow tube and at least a part of the hollow core tube (7) sealingly fitted with each other;
(c) the hollow core tube having a top opening at a top end and a bottom opening at a bottom end, and having a water collecting channel on its outer wall and positioned coaxially inside the case, wherein the top opening is adapted to open into the waste water chamber; and
(d) a membrane having an inner peripheral surface, a top outer peripheral surface, a bottom outer peripheral surface and a side outer peripheral surface; and arranged around the core tube such that the inner peripheral surface of the membrane is spirally wound around the core tube and the side outer peripheral surface is capable of permeation of raw water through its surface;

wherein the membrane has a bottom cover and a top cover, the top cover sealingly engaged with the top outer peripheral surface of the membrane and comprising a through central hole adapted for and sealingly fitted to the core tube to facilitate passage of waste water through the core tube into the waste water chamber; and the bottom cover having a bottom cover central hole spanning beyond the bottom opening of the core tube to allow passage of water from the outer tube through the membrane and the bottom cover central hole into hollow of the core tube, and wherein the bottom cover (9) of the membrane (3) is capped by a bottom cap (9B) which sealingly engages with the bottom cover (9) and the top cap (2T) of the filter case (2) comprises an inner wall and an outer wall and wherein from the inner wall of the top cap (2T) two hollow concentric tubes descend downwardly, a central hollow tube (4C) and a peripheral hollow tube (4P) each having respective inner walls and outer walls.

DETAILED DESCRIPTION OF THE INVENTION

The present invention provides a membrane filter unit and a water treatment device having a membrane filtration unit designed in such a way that the filter membrane has a higher efficiency and prolonged lifetime.

The membrane filter unit of the present invention comprises filter case for housing a membrane; an inner tube housing a waste water chamber and a hollow core tube, a middle tube housing a pure water chamber and an outer tube housing a feed water chamber; the membrane which is spirally wound around the core tube; wherein a top cover and a bottom cover are sealingly engaged with the top outer peripheral surface and the bottom outer peripheral surface of the membrane respectively and the hollow core tube has a water collecting channel on its outer surface.

The structure and design of the membrane filtration unit is such that it solves the problems of scaling, fouling and results in higher efficiency of the membrane and consequently resulting in prolonged lifetime of the membrane filtration unit.

The present inventors were able to design the membrane filtration unit in such a way that with minimum changes as compared to the traditional design of membrane filtration unit, and therefore minimum added costs, the problems associated with membrane filtration units and as identified above are solved in a simple and easy to industrialize manner.

The present invention is not limited in its application to the details of construction and the arrangement of components set forth in the following description or illustrated in the following drawings. The invention is capable of other embodiments and of being implemented in various ways.

The terms "including", "comprising", "containing" or "having" and variations thereof as used herein are meant to encompass the items listed thereafter as well as additional items. Unless specified or limited otherwise, the terms "mounted," "connected," "supported," and "coupled" and variations thereof are used broadly and encompass direct and indirect mountings, connections, supports, and couplings.

Throughout the description of the present invention, wherever a tube or enclosure is defined by naming the structural components forming it, it shall be understood that the identified structural component means 'at least a part of' and that structural component or a particularly identified wall of a structural component need not in its entirety be a part of the enclosure and therefore when such structural component or a particularly identified wall of a structural component is named it should be understood that at least a part or portion of that structural component or a particularly identified wall of a structural component is involved in the formation of a given enclosure.

Throughout the description of the present invention all the physical structural components have inner and outer walls and any reference to inner and outer walls is to be understood in context of the respective structural component. It shall also be understood that unless specified, the inner wall means the wall towards inside of the membrane filter unit or the center of the membrane filter unit and the other wall as the outer wall.

A Membrane Filter Unit

The present invention provides a membrane filter unit (1) comprising:
- (a) a filter case (2) for housing a membrane (3);
- (b) an inner tube (4) housing a wastewater chamber (4A) and a hollow core tube (7), a middle tube (5) housing a pure water chamber (5A) and an outer tube (6) housing a feed water chamber (6A), wherein the inner tube (4), the middle tube (5) and the outer tube (6) are coaxially arranged and formed inside the filter case (2) between the inner wall of the filter case (2) and other components positioned within the filter case and inner tube (4) is formed by at least a part of the central hollow tube and at least a part of the hollow core tube (7) sealingly fitted with each other;
- (c) the hollow core tube (7) having a top opening (7A) at a top end (7TE) and a bottom opening (7B) at a bottom end (7BE), and having a water collecting channel (8) on its outer wall and positioned coaxially inside the case (2), wherein the top opening (7A) is adapted to open into the wastewater chamber (4A); and
- (d) a membrane (3) having an inner peripheral surface (3A), a top outer peripheral surface (3B), a bottom outer peripheral surface (3C) and a side outer peripheral surface (3D); and arranged around the core tube (7) such that the inner peripheral surface (3A) of the membrane is spirally wound around the core tube (7) and the side outer peripheral surface (3D) is capable of permeation of raw water through its surface;
  - wherein the membrane has a bottom cover (9) and a top cover (10),
  - the top cover (10) sealingly engaged with the top outer peripheral surface (3B) of the membrane (3) and comprising a through central hole (10A) adapted for and sealingly fitted to the core tube (7) to facilitate passage of waste water through the core tube (7) into the waste water chamber (4A); and the bottom cover (9) engages with the bottom outer peripheral surface (3C) of the membrane (3) having a bottom cover central hole (9A) spanning beyond the bottom opening (7B) of the core tube (7) to allow passage of water from the outer tube (6) through the membrane (3) and the bottom cover central hole (9A) of the core tube (7) and wherein the bottom cover (9) of the membrane (3) is capped by a bottom cap (9B) which sealingly engages with the bottom cover (9) and the top cap (2T) of the filter case (2) comprises an inner wall and an outer wall and wherein from the inner wall of the top cap (2T) two hollow concentric tubes descend downwardly, a central hollow tube (4C) and a peripheral hollow tube (4P) each having respective inner walls and outer walls.

It is preferable that the membrane filter unit is employed in a device and is more preferable that the membrane filter unit is employed in water treatment device and most preferably a water purifier.

Filter Case

The membrane filter unit of the present invention comprises a filter case for housing a membrane. The filter case preferably comprises a main body having an inner wall and an outer wall, a top cap and a bottom cap.

It is preferable that the top cap of the filter case comprises an inner wall and an outer wall and wherein from the inner wall of the top cap two hollow concentric tubes descend downwardly, a central hollow tube and a peripheral hollow tube each having respective inner walls and outer walls.

The main body and the top cap could be attached together by a snap fit or a threaded male and female screw connection. It is however preferable that the main body and cover are molded together.

The filter case is preferably intended to hold the membrane housing and create chambers enclosed by its structural design.

Though the filter case can be made of any material, but it is preferable that it is made of food grade material and more preferably it is made of plastic and most preferably of either a clear plastic or polypropylene material.

The filter case is preferably designed in a way that prevents leakage through any joints other than the inlet and outlets intended for those purposes.

Hollow Core Tube

The membrane filter unit also comprises a hollow core having a water collecting channel on its outer surface and positioned coaxially inside the case, wherein the top opening is adapted to open into the wastewater chamber.

It is preferable that the hollow core tube has an inner wall, an outer wall, a top edge, and a bottom edge.

It is preferable that the water collecting channel is present on the outer wall of the hollow core tube, preferably on the surface having the largest surface area. It is preferable that the water collecting channel is sealed and impermeable to water from its top and bottom end edge is only permeable to water on the outer wall and preferably the outer surface of hollow core tube. It is preferable that the hollow of the hollow core tube and the water collecting channel on its outer wall are not in fluid connectivity with each other from the surface of the inner wall of the hollow core tube. It is preferable that the inner wall of the hollow core tube is impermeable to water. It is preferable that hollow core tube has top end preferably close to top opening and a bottom end preferably close to the bottom opening. It is further preferable that the top end of the hollow core tube is the end that extends beyond the top cover of the membrane. It is further preferable that the top end of the hollow core tube sealingly engages with the central hollow tube and more preferably outer wall of the top end of the hollow core tube sealingly engages with the central hollow tube to form the inner tube. It is further preferable that outer wall of the top end of the hollow core tube sealingly engages with inner wall of the central hollow tube to form the inner tube.

It is preferable that the hollow core tube has a top end facing the top cap of the filter case and a bottom end facing the bottom cap of the filter case. It is preferred that the hollow core tube engages sealingly with the central hollow tube at its top end such that the top opening of the hollow core tube opens into the central hollow tube.

The hollow core tube is intended to have the membrane of the membrane filter unit spirally wound around it. It is preferable that the inner peripheral surface of the membrane is in contact with the hollow core tube and wound around it.

It is preferable that the hollow core tube allows passage of treated water through it to the treated water chamber and consequently through the treated water outlet to outside of the membrane filter unit.

It is preferable that hollow core tube forms a part of the inner tube.

It is preferable that the hollow core tube comprises a means to allow only one way of water flow that is from bottom cover central hole to upwards in the hollow core tube and does not allow water in the opposite direction, preferably positioned at the bottom end. It is preferable that the means to allow only one way of water flow is a one-way valve at the bottom end. It is preferable that the one-way valve is positioned at the bottom end of the hollow core tube.

It is further preferable that the hollow core tube comprises a plurality of flow guide elements on its outer surface, which are grooves.

It is preferable that an upwardly protruding docking post is placed at the bottom opening of the hollow core tube to hold the hollow core tube in place.

It is preferable that the hollow core tube is made of food grade material, preferably plastic and more preferably of ABS, PPE, PVC, PPO or PSU.

Filter Membrane

The membrane of the membrane filter unit comprises an inner peripheral surface, a top outer peripheral surface, a bottom outer peripheral surface and a side outer peripheral surface; and arranged around the core tube such that the inner peripheral surface of the membrane is spirally wound around the core tube and preferably the side outer peripheral surface is capable of permeation of raw water through its surface.

It is preferable that the membrane could be any spirally wound membrane capable of being wound around the hollow core tube, more preferably the membrane is a separation or a desalination membrane and most preferable a filtration membrane or a reverse osmosis membrane. It is highly preferred that the membrane is a reverse osmosis membrane.

Top Cover

A top cover is sealingly engaged with the top outer peripheral surface of the membrane. The top cover comprises a through central hole adapted for and sealingly fitted to the core tube to facilitate passage of treated water through the hollow core tube into the wastewater chamber.

It is preferable that the top cover downwardly extends to cover a portion of the side outer peripheral surface of the membrane.

Bottom Cover

A bottom cover engages with the bottom outer peripheral surface of the membrane having a bottom cover central hole spanning beyond the bottom opening of the core tube to allow passage of water from the outer tube through the membrane and the bottom cover central hole into hollow of the core tube.

It is preferable that the bottom cap upwardly extends preferable at its edges to cover a portion of the side outer peripheral surface of the membrane.

It is preferable that the bottom cover of the membrane is capped by a bottom cap which sealingly engages with the bottom cover.

Membrane Connector

A membrane connector caps the top cover of the membrane, the membrane connector comprises a cover plate extending upwardly towards center to form a raised enclosure, wherein the raised enclosure preferably sealingly engages with the peripheral hollow tube. It is preferable that the membrane connector is provided with a through central hole in center of the cover plate for the core tube. It is preferable that the central hole of the membrane connector spans beyond the hollow core tube. It is further preferable that the diameter of central hole of the membrane connector is more than the diameter of the hollow core tube. It is more preferable that the diameter of central hole of the membrane connector is at least 1.01 times, more preferably 1.05 times, more preferably 1.1 times, more preferably 1.2 times. more preferably 1.5 times. more preferably 1.6 times. more preferably 1.7 times. more preferably 1.8 times. more preferably 1.9 times more than the diameter of the hollow core tube.

It is further preferable that the membrane connector further comprises a downward skirting and more preferably the downward skirting extends downwardly to cover at least a portion of the outer side peripheral surface of the membrane.

It is preferable that the raised enclosure of the membrane connector has an inner wall and an outer wall and preferably the raised enclosure sealingly engages with peripheral hollow tube. It is preferable that at least a portion of outer wall of the raised enclosure sealingly engages with the inner wall of the peripheral hollow tube. It is more preferable that the raised enclosure of the membrane connector forms an extension of the wall of peripheral hollow tube to form the middle tube. It is further preferable that the inner wall of the raised enclosure forms an extension of the wall of peripheral hollow tube to form the middle tube.

Inner tube, middle tube and the outer tube The membrane filter unit comprises inner tube, middle tube and outer tube and formed inside the filter case preferably between the inner wall of the filter case and other components positioned within the filter case. The inner tube, the middle tube and the outer tube are preferably coaxially arranged preferably around the central axis of the filter case.

Inner Tube

The inner tube houses a waste water chamber and a hollow core tube, a middle tube houses a pure water chamber and an outer tube houses a feed water chamber.

It is preferable that the inner tube is formed by at least a part of the central hollow tube and at least a part of the hollow core tube preferably sealingly fitted with each other, it is more preferable that central hollow tube is sealingly fitted to at least a part of the portion of hollow core tube which extends beyond the top cover of the membrane. It is more preferable that outer wall of top end of the hollow core tube sealingly engages with the inner wall of the central hollow tube.

The inner tube houses a waste water chamber, used for collection and finally dispensing of the waste water or the discarded water. The waste water chamber is not an enclosed space but a space that is in fluid connection with the hollow core tube and is preferably formed in the upper part of the inner tube and more preferably in the space above the hollow core tube.

Middle Tube

The middle tube is formed by at least a part of the outer wall of the central hollow tube, at least a part of outer wall of the hollow core tube, at least a part of inner wall of the raised enclosure of the membrane connector and at least a part of inner wall of the peripheral hollow tube. It is further preferable that the inner wall of top cap which forms the base of peripheral hollow tube and at least a portion of top cover of the membrane form a part of middle tube. It is preferable that the treated water enters the middle tube from the outlets in water collecting channel placed in the top end of the hollow core tube.

It is preferable that the middle tube is formed by at least a part of the central hollow tube preferably the outer wall and at least a part of the peripheral hollow tube preferably the inner wall. It is preferable that at least a part of the peripheral hollow tube of the filter case preferably at least a part of inner wall of the peripheral hollow tube sealingly engages with at least a part of the membrane connector and more preferable that the peripheral hollow tube sealingly engages with the at least a part of raised enclosure of the membrane connector and more preferably with at least a part of outer wall of the raised enclosure.

It is preferable that the raised enclosure of the membrane connector forms an extension of the wall of peripheral hollow tube to form the middle tube. It is also preferable that the inner wall of the raised enclosure forms an extension of the wall of peripheral hollow tube to form the middle tube. It is highly preferable that the outer wall of the raised enclosure sealingly engages with the inner wall of the peripheral hollow tube to form wall of the middle tube.

It is preferable that the central hollow tube sealingly engages with the hollow core tube to form a wall of the middle tube. It is more preferable that at least a part of, preferably at least a part of outer wall of the hollow core tube sealingly engages with at least a part of, preferably at least a part of inner wall of central hollow tube to form a wall of the middle tube.

The middle tube houses the treated water chamber which is used to collect the treated water after the feed water is treated and the treated water chamber is used to collect and finally dispense treated water out of the membrane filtration unit. It is preferable that the middle tube itself functions as the treated water chamber. It is further preferable that the middle tube receives treated water from the outlets in water collecting channel placed in at least a part of the top end of the hollow core tube.

Outer Tube

It is preferable that the outer tube is formed by at least a part of the outer wall of the peripheral hollow tube and at least a part of the inner wall of the main body of filter case. It is further preferable that the outer tube is formed by at least a part of the outer wall of the peripheral hollow tube and at least a part of the inner wall of the main body of filter case, at least a part of the top cap and at least a part of the bottom cap of the filter case. It is more preferable that the outer tube is an enclosure formed between at least a part of outer wall of the peripheral hollow tube of the filter case outer wall, at least a part of inner wall of the main body of the filter case, at least a part of inner wall of the top cap of the filter case which is between the point where peripheral hollow tube descends from the top cap of the filter case and the point where top cap descends downwardly to merge with the main body, and at least a part of the bottom cap of the filter case.

It is preferable that at least a part of the raised enclosure of the membrane connector sealingly engages with the at least a part of peripheral hollow tube to form the outer tube. It is more preferable that at least a part of the inner wall of the peripheral hollow tube sealingly engages with at least a part of outer wall of the membrane connector to form the outer tube.

It is preferable that the membrane connector sealingly engages with the peripheral hollow tube in such a way that it forms an extension of the peripheral hollow tube such that at least a part of outer wall of raised enclosure is a part of outer tube.

The outer tube houses the feed water chamber which is intended to receive feed water, preferably raw water intended for treatment by the membrane filtration unit. The feed water chamber is preferably not an enclosed space within the outer tube but spatially forms the upper portion of the outer tube where the feed water first enters and fills that space before entering the channel or slit formed between the inner wall of main body of the filter case and side outer peripheral surface of the membrane.

Flow Path of Water

The treated water in the membrane filter unit flows through the membrane and finally into the treated water chamber. The feed water enters from the outer tube into the side outer peripheral surface of the membrane, through the membrane and then into the water collecting channel on the outer surface of the hollow core tube, in the channel, the water is seen to be travelling in upward direction and then entering the middle tube from the outlets in water collecting channel placed in the top end of the hollow core tube. The water then collects in the treated water chamber ready for dispensing out of the membrane filter unit.

The wastewater in the membrane filter unit flows through the membrane and finally into the wastewater chamber. The feed water enters from the outer tube into the side outer peripheral surface of the membrane, through the membrane into the bottom cover central hole reaching hollow of the core tube, preferably passing through the means to allow only one way of water flow in the hollow core tube, and therefore is forced to move only in one direction that is upwards into the hollow of the hollow core tube and into the waste water chamber, ready to be dispensed out of the membrane filter unit.

Water Purifier

The present invention also provides a water purifier comprising:
(i) an inlet to receive feed water
(ii) a pre-filter unit;
(iii) an electromechanical means; and,
(iv) membrane filter unit comprising:
   a) a filter case for housing a membrane;
   b) an inner tube housing a waste water chamber and a hollow core tube, a middle tube housing a pure water chamber and an outer tube housing a feed water chamber, wherein the inner tube, the middle tube and the outer tube are coaxially arranged and formed inside the filter case (2) between the inner wall of the filter case (2) and other components positioned within the filter case and inner tube (4) is formed by at least a part of the central hollow tube and at least a part of the hollow core tube (7) sealingly fitted with each other;
   c) a hollow core tube having a top opening at a top end and a bottom opening at a bottom end, and having a water collecting channel on its outer wall and positioned coaxially inside the case, wherein the top opening is adapted to open into the waste water chamber; and
   d) a membrane having an inner peripheral surface, a top outer peripheral surface, a bottom outer peripheral surface and a side outer peripheral surface; and arranged around the core tube such that the inner peripheral surface of the membrane is spirally wound around the core tube and the side outer peripheral surface is capable of permeation of raw water through its surface;
   wherein the membrane has a bottom cover and a top cover,
   the top cover sealingly engaged with the top outer peripheral surface of the membrane and comprising a through central hole adapted for and sealingly fitted to the core tube to facilitate passage of waste water through the core tube into the waste water chamber; and the bottom cover having a bottom cover central hole spanning beyond the bottom opening of the core tube to allow passage of water from the outer tube through the membrane and the bottom cover central hole into hollow of the core tube and wherein the bottom cover (9) of the membrane (3) is capped by a bottom cap (9B) which sealingly engages with the bottom cover (9) and the top cap (2T) of the filter case (2) comprises an inner wall and an outer wall and wherein from the inner wall of the top cap (2T) two hollow concentric tubes descend downwardly, a central hollow tube (4C) and a peripheral hollow tube (4P) each having respective inner walls and outer walls.

(v) an outlet for treated water.

It is preferable that the electromechanical means is a pump positioned upstream of the membrane filtration unit to drive water into the membrane filtration unit.

FIGURES

Brief Description

Figure 7A:
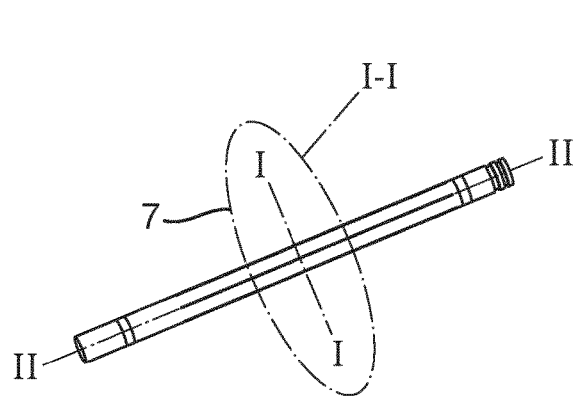
Figure 7B:
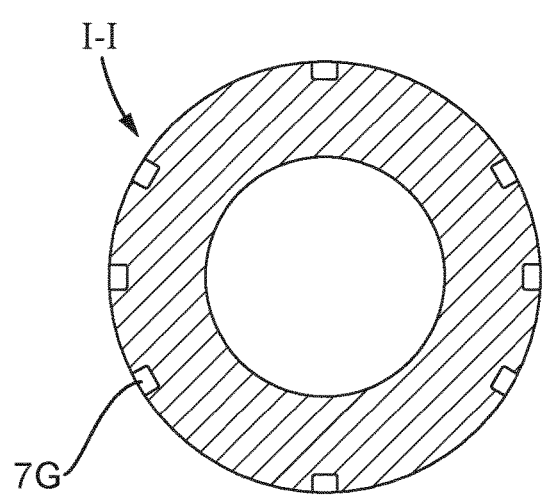
Figure 7C:
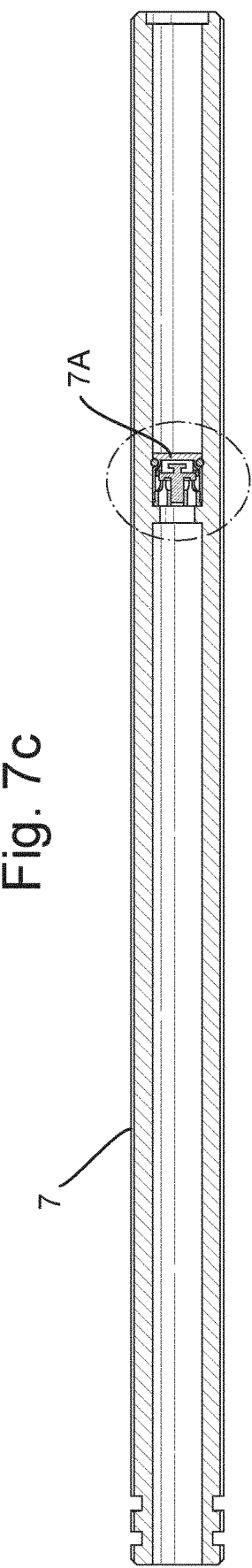
Figure 7D:
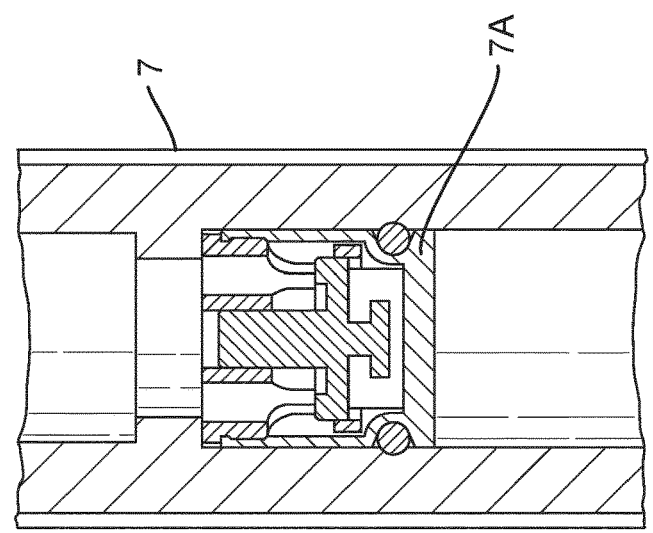

FIGS. 7a-7d show hollow core tube (7). FIG. 7a shows facade structure of core tube (7) and FIG. 7b shows I-I sectional structure of core tube (7) with grooves (7G). FIG. 7c shows II-II sectional structure of core tube and FIG. 7d shows the enlarged portion which is encircled in FIG. 7c to show the sectional structure of check valve built in the core tube.

Figure 8:
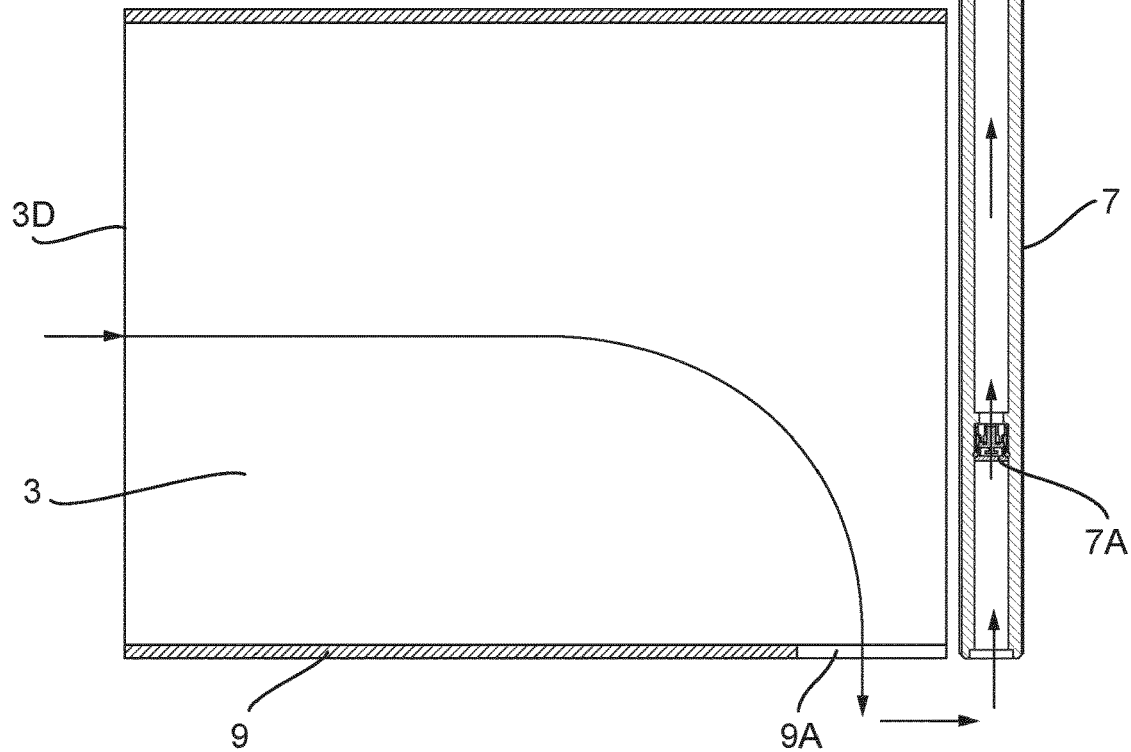

FIG. 8 shows flow path of wastewater in the membrane.

Figure 9:
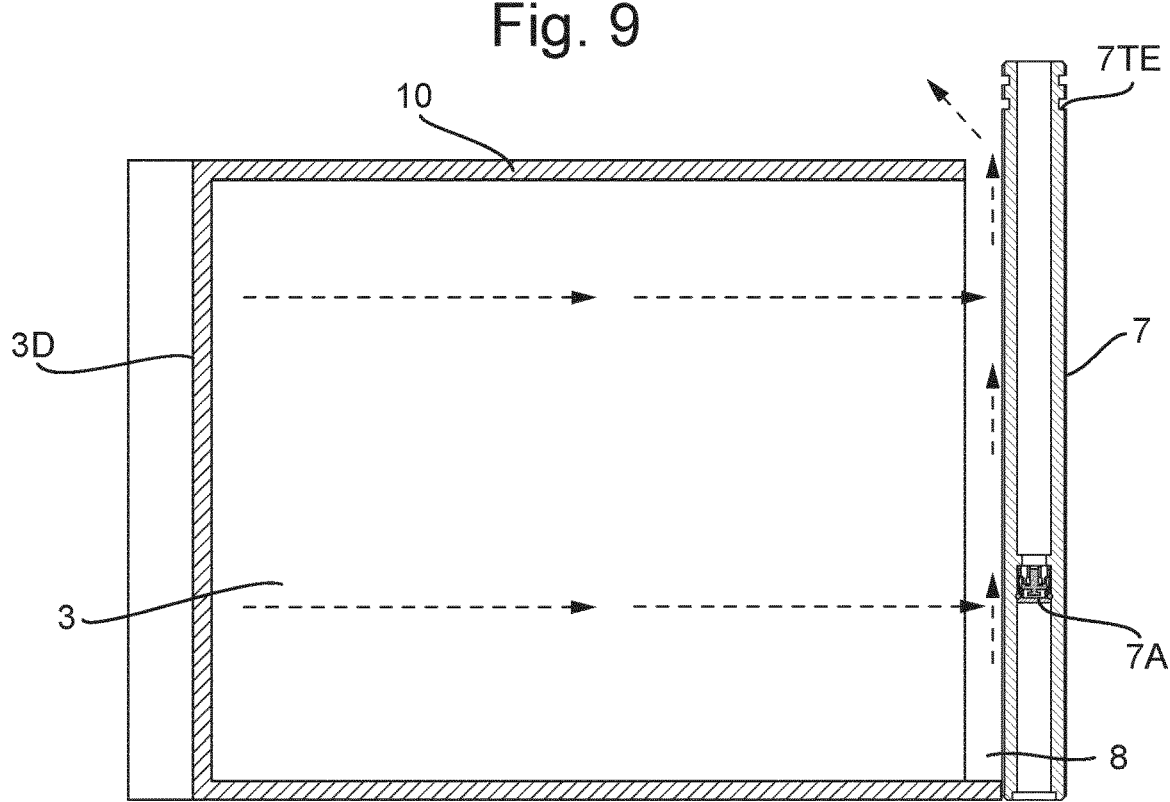

FIG. 9 shows flow path of treated water in the membrane.

DETAILED DESCRIPTION

Figure 1:
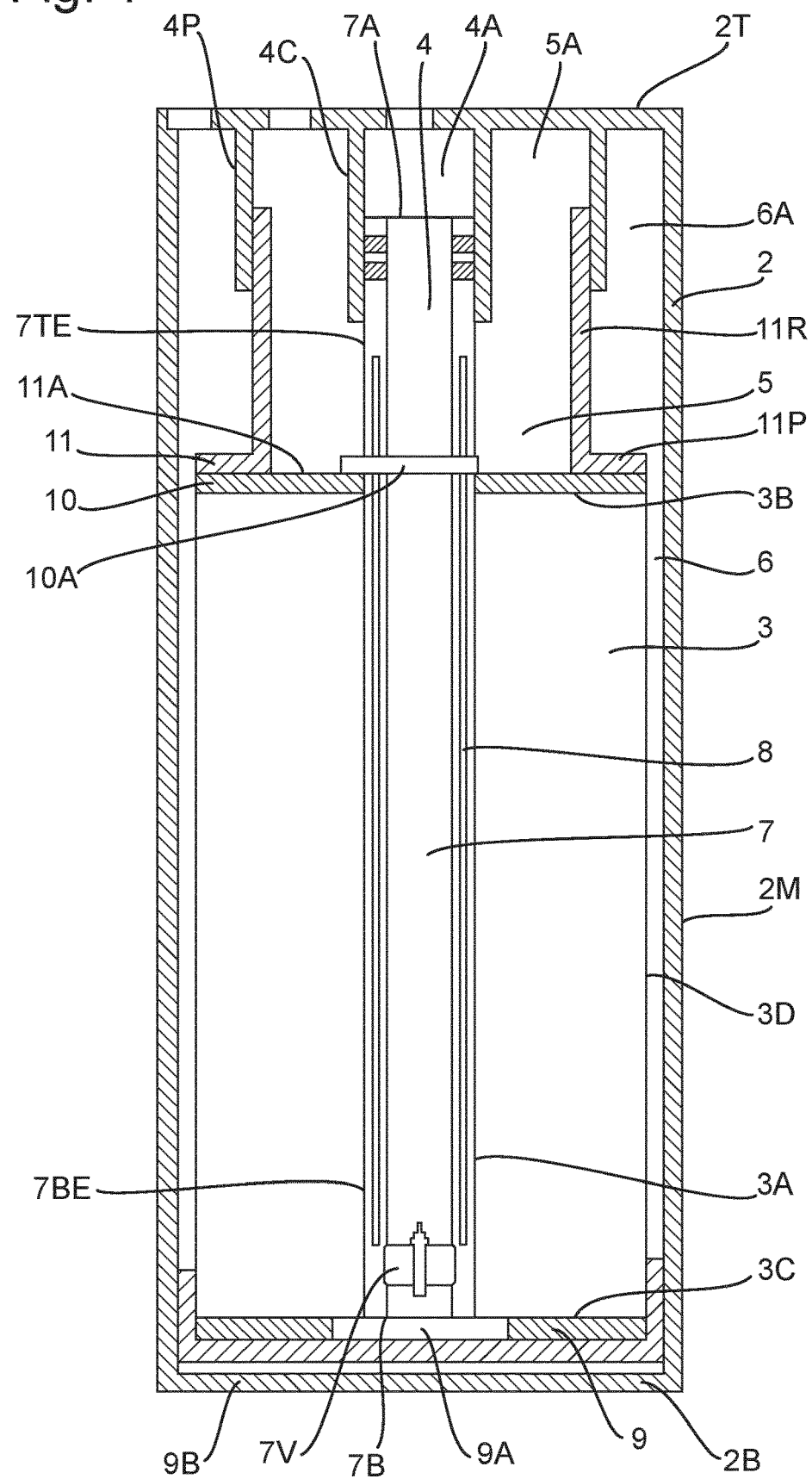
FIG. 1 is a schematic representation of filter unit of first aspect.

FIG. 1 shows a membrane filter unit comprising filter case (2) with main body (2M), a top cap (2C) and a bottom cap (2B) for housing a membrane (3); an inner tube (4) housing a waste water chamber (4A) and a hollow core tube (7), a middle tube (5) housing a pure water chamber (5A) and an outer tube (6) housing a feed water chamber (6A), wherein the inner tube (4), the middle tube (5) and the outer tube (6) are shown to be coaxially arranged.

The hollow core tube (7) shown having a top opening (7A) at a top end (7TE) and a bottom opening (7B) at a bottom end (7BE), and having a water collecting channel (8) on its outer wall and positioned coaxially inside the case (2), wherein the top opening (7A) is adapted to open into the wastewater chamber (4A).

The membrane (3) is shown having an inner peripheral surface (3A), a top outer peripheral surface (3B), a bottom outer peripheral surface (3C) and a side outer peripheral surface (3D); and arranged around the core tube (7) such that the inner peripheral surface (3A) of the membrane is spirally wound around the core tube (7) and the side outer peripheral surface (3D) is capable of permeation of raw water through its surface.

The top cover (10) and a bottom cover (9) are shown sealingly engaged with the top outer peripheral surface (3B) and the bottom outer peripheral surface (3C) of the membrane (3) respectively. The top cover is shown to comprise a through central hole (10A) adapted for and sealingly fitted to the core tube (7).

The bottom cover (9) is shown having a bottom cover central hole (9A) spanning beyond the bottom opening (7B) of the core tube (7) to allow passage of water from the outer tube (6) through the membrane (3) and the bottom cover central hole (9A) into hollow of the core tube (7).

Figure 2:
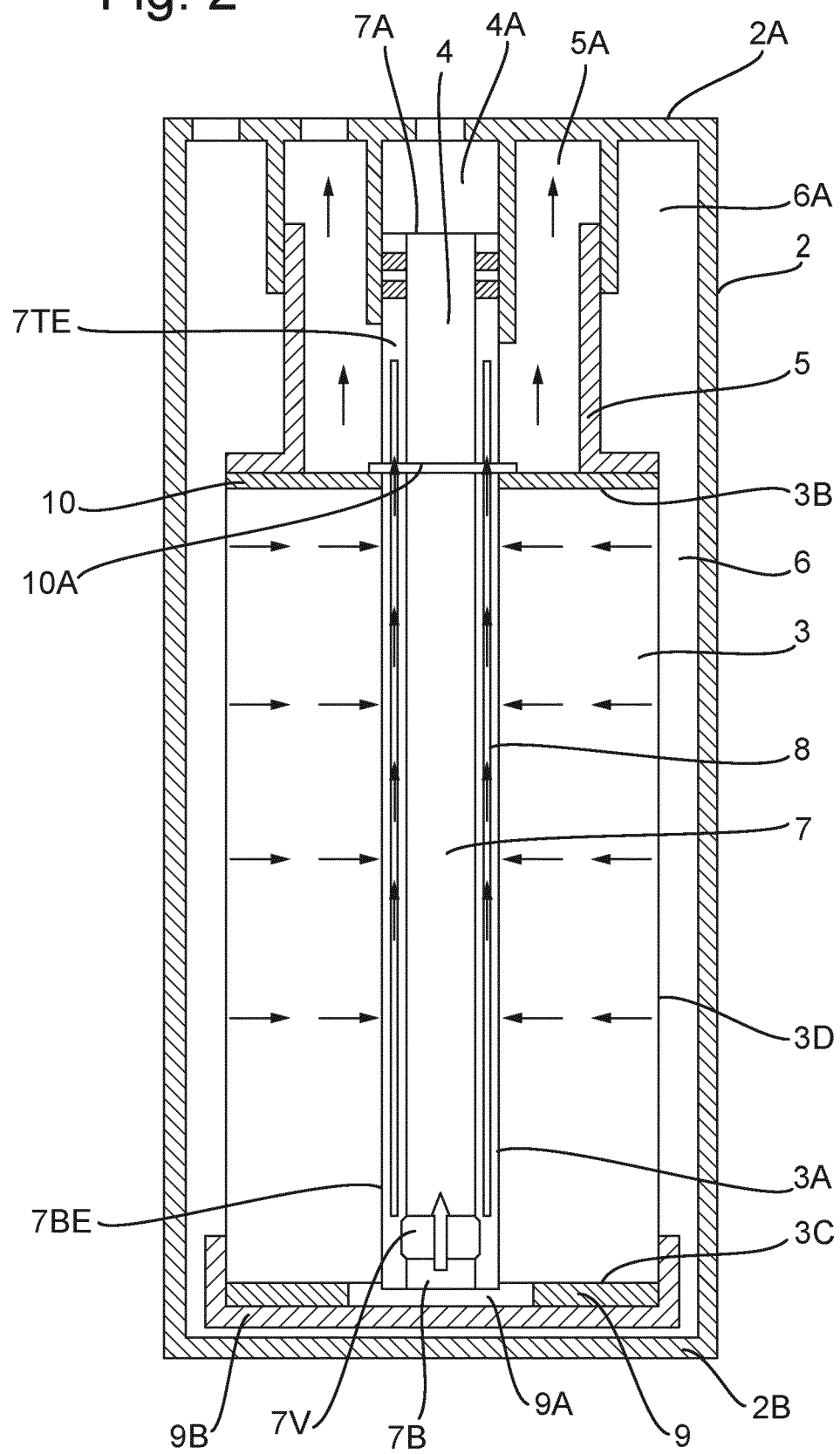
FIG. 2 is a schematic representation of filter unit of first aspect showing the water flow path of the treated water within the filter unit.

FIG. 2 shows flow of treated water in the membrane filter unit (1) through the membrane (3) and finally into the treated water chamber (5A). The feed water enters from the outer tube (6) into the side outer peripheral surface of the membrane (3D), through the membrane (3) and then into the water collecting channel (8) on the outer wall of the hollow core tube (7), in the channel, the water is seen to be travelling in upward direction and then entering the middle tube (5) from the outlets in water collecting channel (8) placed in the top end (7TE) of the hollow core tube (7). The water then collects in the treated water chamber (5A) ready for dispensing out of the membrane filter unit (1).

Figure 3:
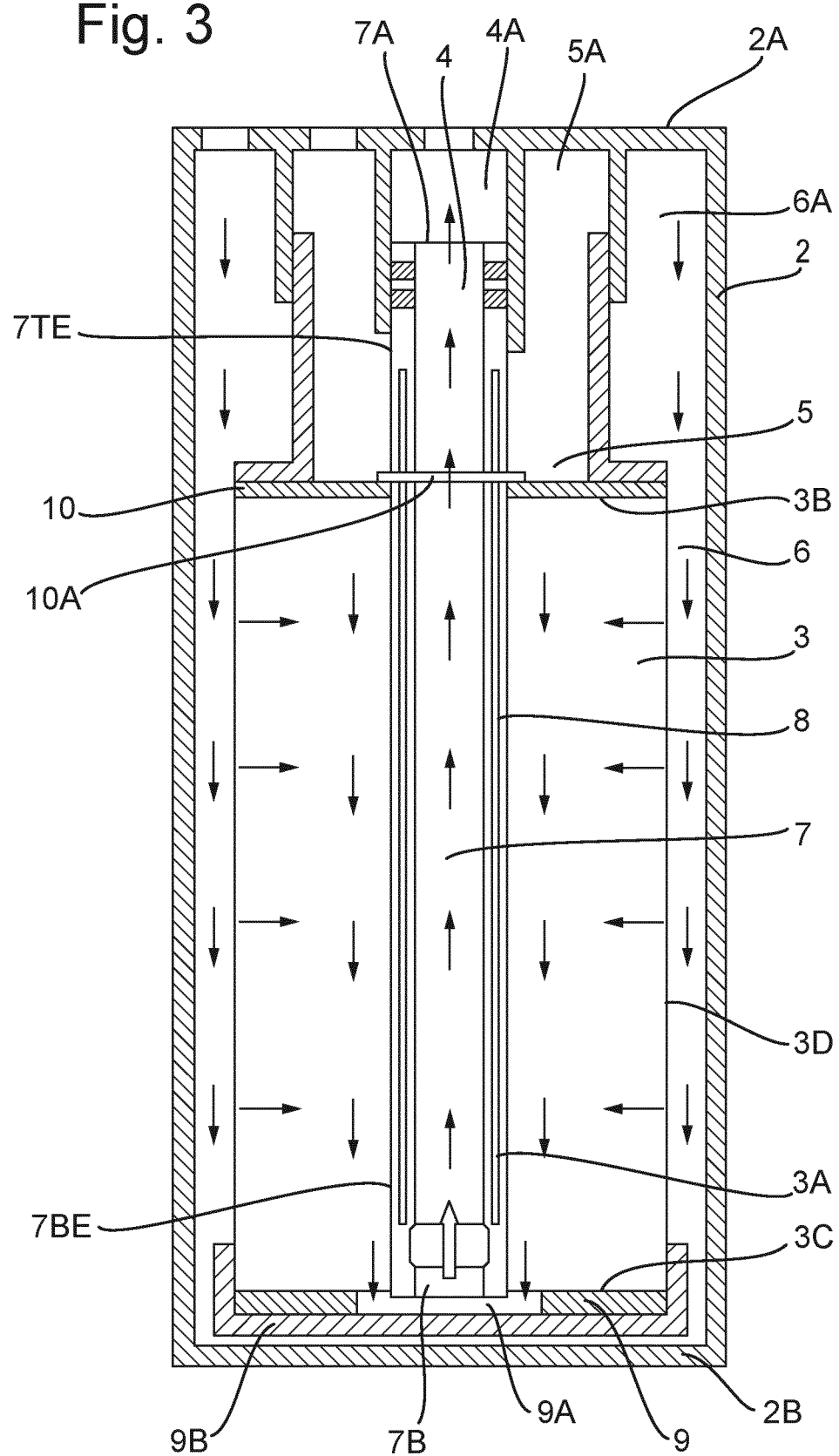
FIG. 3 is a schematic representation of filter unit of first aspect showing the water flow path of the wastewater within the filter unit.

FIG. 3 shows flow of wastewater in the membrane filter unit (1) through the membrane (3) and finally into the wastewater chamber (4A). The feed water enters from the outer tube (6) into the side outer peripheral surface of the membrane (3D), through the membrane (3) into the bottom cover central hole (9A) reaching hollow of the core tube (7), preferably passing through the means to allow only one way of water flow (7V) in the hollow core tube (7), and therefore is forced to move only in one direction that is upwards into the hollow of the hollow core tube (7) and into the waste water chamber (4A), ready to be dispensed out of the membrane filter unit (1).

Figure 4A:
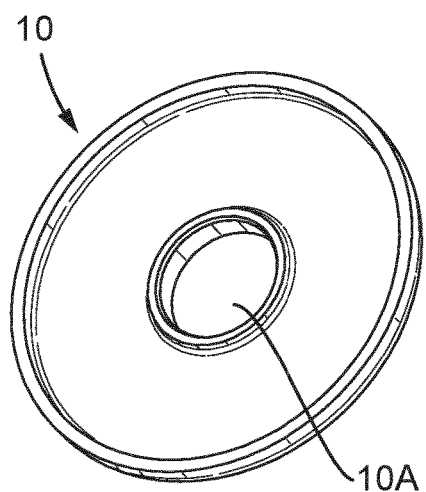
FIG. 4a shows the façade structure of top cover and 4b shows the sectional structure of top cover
Figure 4B:
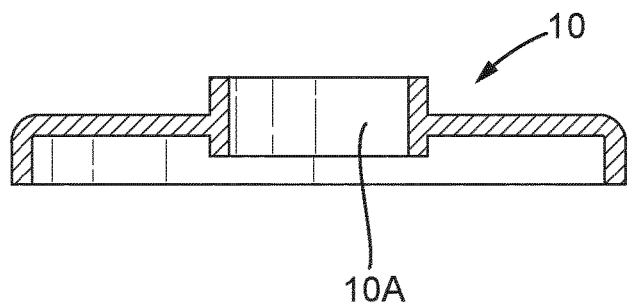

FIG. 4a shows the façade structure of top cover and 4b shows the sectional structure of top cover. the top cover (10) is shown to comprise a through central hole (10A) adapted for and sealingly fitted to the core tube (7).

Figure 5:
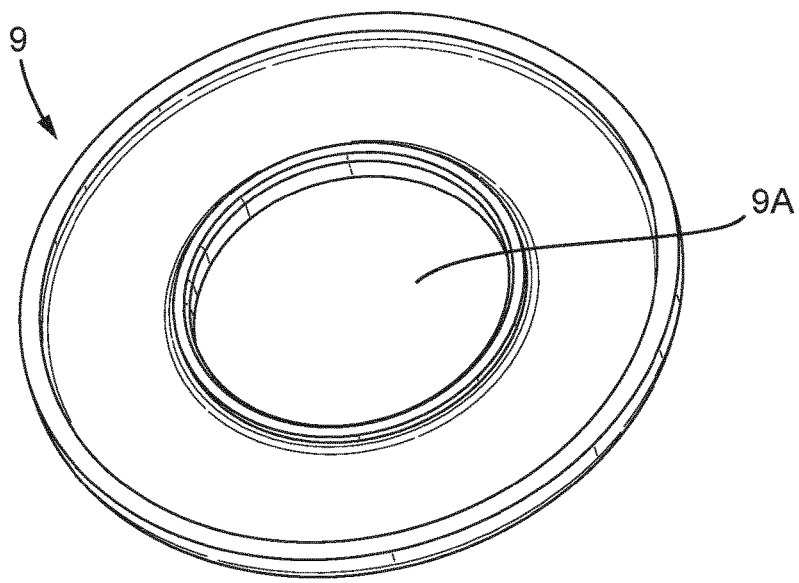
FIG. 5 shows bottom cover (9) with bottom cover central hole (9A).

FIG. 5 show the bottom cover (9) adapted to engage with the bottom outer peripheral surface (3C) of the membrane (3) having a bottom cover central hole (9A).

Figure 6:
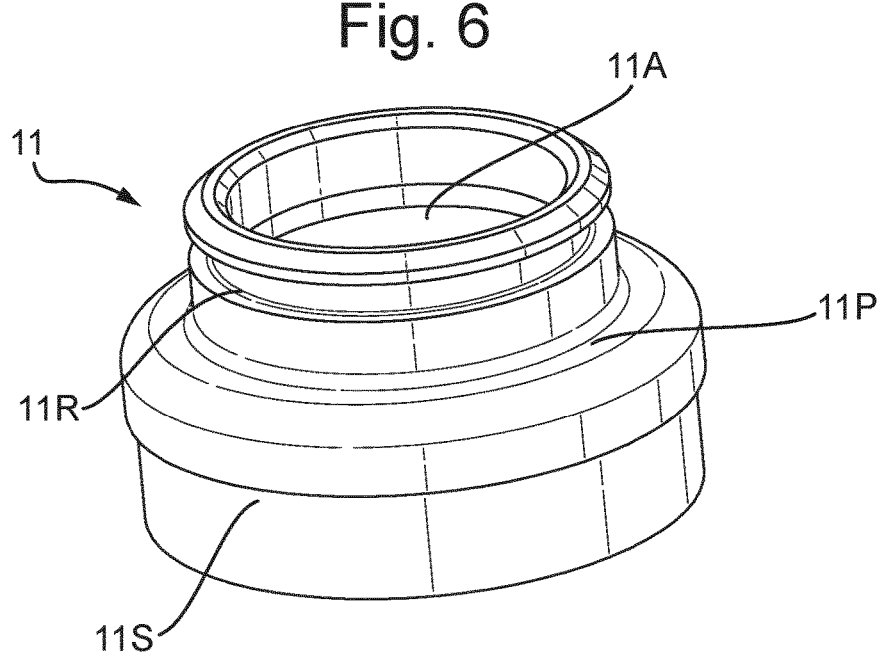
FIG. 6 shows isometric view of the membrane connector

FIG. 6 shows isometric view of the membrane connector (11), the membrane connector is shown comprising a cover plate (11P) extending upwardly towards center to form a raised enclosure (11R) and a downward skirting (11S). A through central hole (11A) in the center of the cover plate (11P) is also shown in the figure.

FIG. 7 shows hollow core tube (7) with grooves (7G), FIG. 7a shows facade structure of core tube and FIG. 7b shows I-I sectional structure of core tube. FIG. 7c shows II-II sectional structure of core tube and FIG. 7d shows the enlarged portion which is encircled in FIG. 7c to show the sectional structure of check valve built (7v) in the core tube.

FIG. 8 shows flow path of wastewater in the membrane (3), where the feed water is shown to enter from side outer peripheral surface (3D) of the membrane, pass through the membrane (3), into the bottom cover central hole (9A) and then into hollow of the core tube (7), and then in move upwards direction because of the presence of one way valve (7A) and consequently into the waste water chamber (4A).

FIG. 9 shows flow path of treated water in the membrane (3), where the feed water is shown to enter from side outer peripheral surface (3D) of the membrane, pass through the membrane (3), the treated water enters the water collecting channel (8) on the outer wall of the hollow core tube (7) and consequently enters the middle tube through the portion of water collecting channel (8) present on the outer wall of the top end of the hollow core tube (7TE).

The various features of the present invention referred to in individual sections above apply, as appropriate, to other sections mutatis mutandis. Consequently, features specified in one section may be combined with features specified in other sections as appropriate. Any section headings are added for convenience only and are not intended to limit the disclosure in any way.

EXAMPLES

Example 1

The experiment was conducted to find the performance of the membrane filter unit of the present invention have a reverse osmosis (RO) membrane and compared with a traditional reverse osmosis (RO) membrane filter unit. The parameters considered for the performance were salt rejection efficacy and permeate productivity of the membrane filter unit.

The control system used was a traditional RO water purifier. Both the water purifier systems had a water pump, a 400 RO filter element and 800 cc current limiter. The feed water was at 400 TDS and 25° C. for both the purifiers. The pressure at the side of feed water of RO filter was 100 psi and the pressure at the side of feed water of RO filter was 0 psi. The permeate productivity and RO salt rejection percentage was noted for both as presented by the tables 1 and 2 given below.

TABLE 1

Water purifier RO filter unit of the present invention

| Permeate productivity (GPD/psi) | RO's normalized product flow rate | Total pure water (L) | RO's salt rejection (%) |
| --- | --- | --- | --- |
| 5.3 | 100% | 0 | 95.0 |
| 3.8 | 71.6% | 1224 | 97.7 |
| 3.4 | 64.1% | 2343 | 97.8 |
| 2.4 | 45.2% | 3571 | 97.8 |
| 2.2 | 41.5% | 4667 | 97.9 |

TABLE 2

Water purifier with Traditional RO

| Permeate productivity (GPD/psi) | RO's normalized product flow rate | Total pure water (L) | RO's salt rejection (%) |
| --- | --- | --- | --- |
| 5.3 | 100% | 0 | 86.1 |
| 3.8 | 71.7% | 638 | 93.4 |
| 3.0 | 56.6% | 2142 | 93.6 |
| 2.0 | 37.7% | 3290 | 93.4 |

It is clearly evident from the tables as presented above that both the water purifiers started with psi pressure but the pressure falls to only 2.4 for the water purifier RO filter unit of the present invention even at 3571 Liters of water as compared to a fall of 2.0 in the traditional RO water purifier at 3290 Liters, the traditional membrane in fact sees a decline of 3.8 psi only at 638 Liters of pure water as compared to the RO filter unit of the present invention which sees the same decline in pressure at 1224 Liters of water which is close to double of 638 Liters.

The RO's salt rejection recorded with the water purifier RO filter unit of the present invention is very good to begin with at 95% and then increases to 97.7% and then remains constant over 4667 Liters of pure water dispensed from the purifier. On the other hand, the traditional RO water purifier has an initial salt rejection of about 86.1% which increases to only 93.4% and then remains almost constant over 3290 Liters of pure water dispensed from the purifier. Therefore, overall salt rejection is better in the water purifier having the membrane filter unit of the present invention. Higher salt rejection means more safe water over the lifetime of the membrane filter unit.

Both the RO purifier systems are assumed to start at 100% flow rate. The water purifier RO filter unit of the present invention falls slowly from 71.7% at 1224 Liters of water to only at 45.2% at 3571 Liter of water (more than double the volume of pure water of 1224 Liters).

Whereas the traditional RO falls to 71.7 only at 638 Liters of pure water, and drops to 56.6% at 2142 Liters of water which is way less compared to the water purifier RO filter unit of the present invention and finally falls to 37.7% at 3290 Liters of pure dispensed water. This speedy decay in flow rate indicates faster deterioration of the traditional membrane (Table 2) and slow decline in flow rate of water purifier RO filter unit of the present invention (Table 1) means longer lifetime of the membrane filter unit.

The invention claimed is:

1. A membrane filter unit (1) comprising:
   (a) a filter case for housing a membrane;
   (b) an inner tube housing a wastewater chamber and a hollow core tube, a middle tube housing a pure water chamber and an outer tube housing a feed water chamber, wherein the inner tube, the middle tube and the outer tube are coaxially arranged and formed inside the filter case between the inner wall of the filter case and other components positioned within the filter case and inner tube is formed by at least a part of a central hollow tube and at least a part of the hollow core tube sealingly fitted with each other;
   (c) the hollow core tube (7) having a top opening at a top end and a bottom opening at a bottom end, and having a water collecting channel on its outer wall and positioned coaxially inside the case, wherein the top opening is adapted to open into the wastewater chamber; and
   (d) a membrane having an inner peripheral surface, a top outer peripheral surface, a bottom outer peripheral surface and a side outer peripheral surface; and arranged around the core tube such that the inner peripheral surface of the membrane is spirally wound around the core tube and the side outer peripheral surface is capable of permeation of raw water through its surface;
      wherein the membrane has a bottom cover and a top cover, the top cover sealingly engaged with the top outer peripheral surface of the membrane and comprising a through central hole adapted for and sealingly fitted to the core tube to facilitate passage of waste water through the core tube into the waste water chamber;
      and the bottom cover engages with the bottom outer peripheral surface of the membrane having a bottom cover central hole spanning beyond the bottom opening of the core tube to allow passage of water from the outer tube through the membrane and the bottom cover central hole of the core tube and wherein the bottom cover of the membrane is capped by a bottom cap which sealingly engages with the bottom cover and the top cap of the filter case comprises an inner wall and an outer wall and wherein from the inner wall of the top cap two hollow concentric tubes descend downwardly, a central hollow tube and a peripheral hollow tube each having respective inner walls and outer walls.

2. The membrane filter unit according to claim 1, wherein the core tube comprises a one-way valve at the bottom end.

3. The membrane filter unit according to claim 1, wherein the core tube comprises a plurality of flow guide elements on its outer wall, where said elements are grooves.

4. The membrane filter unit according to claim 1, wherein the filter case comprises a main body having an inner wall and an outer wall, a top cap and a bottom cap.

5. The membrane filter unit according to claim 4, wherein the inner tube is formed by the central hollow tube and the hollow core tube.

6. The membrane filter unit according to claim 5, wherein the inner tube is formed by at least a part of the central hollow tube and at least a part of the hollow core tube sealingly fitted with each other.

7. The membrane filter unit according to claim 5, wherein the outer tube is formed by at least a part of the outer wall of the peripheral hollow tube and at least a part of the inner wall of the main body of filter case.

8. The membrane filter unit according to claim 1, wherein the top end of the core tube is that portion which extends beyond the central hole of the top cover.

9. The membrane filter unit according to claim 1, wherein the top end of the core tube has outlets in water collecting channel to allow water to enter in the middle tube and into the treated water chamber.

10. The membrane filter unit according to claim 1, wherein the top cover of the membrane filter is capped by a membrane connector, the membrane connector comprising a cover plate extending upwardly towards center to form a raised enclosure, wherein the raised enclosure sealingly engages with the peripheral hollow tube.

11. The membrane filter unit according to claim 10, wherein the membrane connector is provided with a through central hole for the core tube.

12. The membrane filter unit according to claim 10, wherein the middle tube is formed by at least a part of the outer wall of the central hollow tube, at least a part of outer wall of the hollow core tube, at least a part of inner wall of the raised enclosure of the membrane connector and at least a part of inner wall of the peripheral hollow tube.

13. A water purifier comprising the membrane filter unit according to according to claim 1.

14. The water purifier according to claim 12 wherein the water purifier is used to purify in household water.

* * * * *